US 7,848,573 B2

(12) United States Patent
Wecker et al.

(10) Patent No.: US 7,848,573 B2
(45) Date of Patent: Dec. 7, 2010

(54) SCALED TEXT REPLACEMENT OF INK (75) Inventors: David Brian Wecker, Redmond, WA (US); Richard I. Brass, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 10/725,604

(22) Filed: Dec. 3, 2003

(65) Prior Publication Data

US 2005/0135678 A1   Jun. 23, 2005

(51) Int. Cl.
GO6K 9/18 (2006.01)
(52) U.S. Cl. .................................................. 382/186
(58) Field of Classification Search ................. 382/186, 382/187, 292

See application file for complete search history.

(56) References Cited

U.S. PATENT DOCUMENTS

| | | | |
|---|---|---|---|
| 4,829,576 A | 5/1989 | Porter | |
| 4,866,778 A | 9/1989 | Baker | |
| 5,111,514 A * | 5/1992 | Ohta | 382/177 |
| 5,151,950 A * | 9/1992 | Hullender | 382/187 |
| 5,331,431 A * | 7/1994 | Jasinski | 358/462 |
| 5,367,453 A * | 11/1994 | Capps et al. | 715/531 |
| 5,406,480 A | 4/1995 | Kanno | |
| 5,502,774 A | 3/1996 | Bellegarda et al. | |
| 5,513,278 A * | 4/1996 | Hashizume et al. | 382/187 |
| 5,517,578 A | 5/1996 | Altman et al. | |
| 5,583,543 A | 12/1996 | Takahashi et al. | |
| 5,590,257 A | 12/1996 | Forcier | |
| 5,596,694 A | 1/1997 | Capps | |
| 5,615,378 A | 3/1997 | Nishino et al. | |
| 5,649,027 A | 7/1997 | Mahajan et al. | |
| 5,659,771 A | 8/1997 | Golding | |

(Continued)

FOREIGN PATENT DOCUMENTS

EP   1 363 232 A2   11/2003

(Continued)

OTHER PUBLICATIONS

Ward, Jean, et al., "An Annotated Bibliography in Pen Computing and Handwriting Character Recognition," 1992.

(Continued)

*Primary Examiner*—Vu Le
*Assistant Examiner*—Michael Vanchy, Jr.
(74) *Attorney, Agent, or Firm*—Shook, Hardy & Bacon L.L.P.

(57) ABSTRACT

Systems, methods, and computer-readable media for processing electronic ink: (a) receive electronic ink input; (b) convert the input to machine-generated objects; and (c) render the objects such that their size substantially corresponds to the input's original size. The input ink may constitute text, and the machine-generated objects may correspond to words, lines, and/or other groupings of text generated by a handwriting recognizer. To enable quick and easy identification of recognizer errors, in at least some systems and methods, a user may select one or more words, which will cause the system to display the original ink corresponding to the selected word(s). Such systems also may display alternative words generated by the recognizer corresponding to the selected original ink and allow the user to select one of the alternatives to make corrections in the recognized text (akin to using a spell-checking or handwriting recognition program).

25 Claims, 8 Drawing Sheets

U.S. PATENT DOCUMENTS

| | | | |
|---|---|---|---|
| 5,666,139 | A | 9/1997 | Thielens et al. |
| 5,682,439 | A | 10/1997 | Beernink et al. |
| 5,710,916 | A | 1/1998 | Barbara et al. |
| 5,715,469 | A | 2/1998 | Arning |
| 5,717,939 | A | 2/1998 | Bricklin et al. |
| 5,764,799 | A | 6/1998 | Hong et al. |
| 5,787,455 | A | 7/1998 | Seybold |
| 5,802,388 | A | 9/1998 | Zetts et al. |
| 5,812,697 | A | 9/1998 | Sakai et al. |
| 5,841,901 | A | 11/1998 | Arai et al. |
| 5,850,480 | A | 12/1998 | Scanlon |
| 5,855,000 | A | 12/1998 | Waibel et al. |
| 5,870,702 | A | 2/1999 | Yamabana |
| 5,883,986 | A | 3/1999 | Kopec et al. |
| 5,907,839 | A | 5/1999 | Roth |
| 5,956,739 | A | 9/1999 | Golding et al. |
| 5,960,447 | A | 9/1999 | Holt et al. |
| 5,966,464 | A | 10/1999 | Kojima |
| 6,005,973 | A | 12/1999 | Seybold et al. |
| 6,014,460 | A | 1/2000 | Fukushima et al. |
| 6,052,482 | A | 4/2000 | Arai et al. |
| 6,055,333 | A | 4/2000 | Guzik et al. |
| 6,108,445 | A | 8/2000 | Uehara |
| 6,111,985 | A | 8/2000 | Hullender et al. |
| 6,154,579 | A | 11/2000 | Goldberg |
| 6,167,376 | A | 12/2000 | Ditzik |
| 6,185,333 | B1 | 2/2001 | Arai et al. |
| 6,205,261 | B1 | 3/2001 | Goldberg |
| 6,285,785 | B1 | 9/2001 | Bellegarda et al. |
| 6,337,698 | B1 | 1/2002 | Keely, Jr. et al. |
| 6,340,967 | B1 | 1/2002 | Maxted |
| 6,421,461 | B1 * | 7/2002 | Arai et al. .................. 382/187 |
| 6,424,743 | B1 | 7/2002 | Ebrahimi |
| 6,438,523 | B1 | 8/2002 | Oberteuffer et al. |
| 6,473,517 | B1 | 10/2002 | Tyan et al. |
| 6,513,005 | B1 | 1/2003 | Su et al. |
| 6,583,798 | B1 | 6/2003 | Hoek et al. |
| 6,618,697 | B1 | 9/2003 | Kantrowitz et al. |
| 6,701,023 | B1 | 3/2004 | Gaither et al. |
| 6,735,341 | B1 | 5/2004 | Horie et al. |
| 6,782,510 | B1 | 8/2004 | Gross et al. |
| 6,788,815 | B2 | 9/2004 | Lui et al. |
| 6,847,734 | B2 | 1/2005 | Hamamura |
| 6,904,405 | B2 | 6/2005 | Suominen |
| 6,912,498 | B2 | 6/2005 | Stevens et al. |
| 6,970,599 | B2 * | 11/2005 | Longe et al. ................. 382/185 |
| 2002/0180689 | A1 | 12/2002 | Venolia |
| 2002/0194223 | A1 | 12/2002 | Meyers et al. |
| 2003/0007018 | A1 | 1/2003 | Seni et al. |
| 2003/0014252 | A1 | 1/2003 | Shizuka et al. |
| 2003/0016873 | A1 | 1/2003 | Nagel et al. |
| 2003/0053084 | A1 * | 3/2003 | Geidl et al. ................... 358/1.6 |
| 2003/0091234 | A1 * | 5/2003 | Lapstun et al. ............. 382/187 |
| 2003/0189603 | A1 | 10/2003 | Goyal et al. |
| 2003/0212961 | A1 | 11/2003 | Soin et al. |
| 2003/0214491 | A1 * | 11/2003 | Keely et al. ................. 345/179 |
| 2003/0215142 | A1 * | 11/2003 | Gounares et al. ............ 382/190 |
| 2003/0216913 | A1 | 11/2003 | Keely et al. |
| 2003/0233237 | A1 | 12/2003 | Garside et al. |
| 2005/0041834 | A1 * | 2/2005 | Wakeam et al. ............. 382/100 |
| 2005/0100214 | A1 * | 5/2005 | Zhang et al. ................ 382/179 |

FOREIGN PATENT DOCUMENTS

| | | |
|---|---|---|
| EP | 1363229 A2 | 11/2003 |
| EP | 1365349 A2 | 11/2003 |
| JP | 63095590 | 4/1988 |
| JP | 04290184 | 10/1992 |

OTHER PUBLICATIONS

OCR Master User's Guide, published by Microforum, 1997, pp. 3-6, 3-7, 3-14, 3-15, and 5-2-5-5.

European Search Report dated Mar. 23, 2005.

Bill Camarda, "Using Microsoft Word 97", Que Corporation, pp. 54-55 and 199-200, 1997.

Wolfgang Hurst et al., "Error Repair in Human Handwriting—An Intelligent User Interface for Automatic On-Line Handwriting Recognition", IEEE Joint Symposia on Intelligence and Systems, pp. 389-395, 1998.

Ivan Poupyrev et al., "Virtual Notepad: Handwriting in Immersive VR," IEEE Virtual Reality Annual International Symposium, pp. 126-132, Mar. 14-18, 1998.

L. Schomaker, "From Handwriting Analysis to Pen-Computer Applications," Electronics and Communication Engineering Journal, vol. 10, No. 3, pp. 98-102, 1998.

U.S. Appl. No. 10/207,133, filed Jul. 30, 2002 (Marieke Iwema, et al.).

U.S. Appl. No. 10/734,305, filed Dec. 15, 2003 (Jian Wang, et al.).

Nicholas Baran, "Rough Gems: First Pen Systems Show Promise, Lack Refinement," *BYTE*, pp. 212-222, Apr. 1992.

R. Zhao et al., "Pen-based Interfaces in Engineering Environments," *Symbiosis of Human and Artifact*, pp. 531-536, 1995.

C.G. Leedham, "Historical Perspectives of Handwriting Recognition Systems," *Proc. IEE Colloquium on Handwriting and Pen-Based Input*, Savoy Place, Digest No. 1994/065, pp. 1/1-1/3, Mar. 1994 pp. 1-4.

Hirokazu Bandoh et al., "User Interfaces for Correcting Errors in Writing-box free Recognition of Handwritten Text," *IPSJ Journal*, vol. 43, No. 6, pp. 1996-2005, Jun. 2002.

Zouheir Trabelsi et al., "A Voice and Ink XML Multimodal Architecture for Mobile e-Commerce Systems," *WMC '02*, pp. 100-104, Sep. 2002.

Bernhard Suhm et al., "Multimodal Error Correction for Speech User Interfaces," *ACM Transactions on Computer-Human Interaction*, vol. 8, No. 1, pp. 60-98, Mar. 2001.

Bernhard Suhm et al., "Model-based and Empirical Evaluation of Multimodal Interactive Error Correction," *ACM*, pp. 584-591, 1999.

Karen Kukich, "Techniques for Automatically Correcting Words in Text," *ACM Computing Surveys*, vol. 24, No. 4, pp. 377-439, Dec. 1992.

Michael A. Grasso et al., "The Integrality of Speech in Multimodal Interfaces," *ACM Transactions on Computer-Human Interaction*, vol. 5, No. 4, pp. 303-325, Dec. 1998.

* cited by examiner

The systems maintain the original word arrangement.

FIG. 7A

The systems maintain the original word arrangement.

FIG. 7B

The systems maintain the original word arrangement.

SCALED TEXT REPLACEMENT OF INK

FIELD OF THE INVENTION

The present invention generally relates to systems, methods, and computer-readable media for processing electronic ink data in pen-based computing systems and/or other computing systems.

BACKGROUND

Typical computer systems, especially computer systems using graphical user interfaces (GUIs), are optimized for accepting user input from one or more discrete input devices, such as a keyboard for entering text, and a pointing device, such as a mouse with one or more buttons, for operating the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, and the like.

Recently, however, pen-based computing systems, such as tablet PCs and the like, have been increasing in popularity. In pen-based computing systems, user input advantageously may be introduced using an electronic "pen" or stylus (e.g., akin to writing with a pen or pencil on a piece of paper). Indeed, in at least some pen-based computing systems, all user input is capable of being entered and manipulated using an electronic pen input device, and the user interface is fully controllable using only the electronic pen.

As pen-based computing systems are becoming more popular, users are increasingly entering more data in the form of electronic ink. In many instances, however, users wish to convert the original electronic ink data to machine-generated text, text suitable for use and manipulation by conventional word processing programs and other application programs. In conventionally available systems, when ink is converted to text, it is converted as a block into text, and this new block of text typically replaces the original ink or exists separately as a text block. In such systems, virtually none of the original spatial information relating to the original ink arrangement and orientation is maintained (except for, possibly, line breaks), and much of the original user intent (e.g., larger writing size v. smaller writing size) is ignored. In some instances, correction of the converted text can be difficult, either because the original ink is difficult to call up and review after it has been converted and/or because the ink and text are located at two different positions.

Accordingly, there is a need in the art for improved electronic ink processing systems and methods that maintain the original spatial arrangement and orientation of ink and allow for easy review of the original ink during handwriting recognition and text correction. Such systems and methods would be particularly useful in pen-based computing systems and other devices that accept input in the form of electronic ink and/or from an electronic pen or stylus and/or systems or devices that display or otherwise process electronic ink data.

SUMMARY

Aspects of the present invention relate to systems and methods for processing electronic ink. Such systems and methods may include: (a) receiving electronic ink input (e.g., through an input device, such as a digitizer); (b) converting the electronic ink input to one or more machine-generated objects (e.g., using a computer processor having handwriting recognition capability); and (c) rendering the one or more machine-generated objects such that a size of the machine-generated object or objects substantially corresponds to an original size of the electronic ink input (e.g., using a computer processor for driving a monitor, display, printer, or the like). The electronic ink input may constitute electronic ink textual input, and the machine-generated objects may correspond to words, lines, and/or other groupings of machine-generated text. In some examples of the invention, a user may select at least one object from the rendered machine-generated object or objects (e.g., one or more words), and the systems and methods then will display (at least temporarily) the original electronic ink input corresponding to the selected machine-generated object or objects. Systems and methods according to some examples of the invention further may display machine-generated alternative objects corresponding to the selected original ink input (e.g., one or more alternative words) so that a user can select one of the alternative objects e.g., to make corrections in the recognized information (akin to using a spell-checking program or a conventional handwriting recognition program). Additional aspects of the invention relate to computer-readable media including computer-executable instructions stored thereon for performing various methods and/or operating various systems, including systems and methods like those described above.

BRIEF DESCRIPTION OF THE DRAWINGS

The above and other objects, features, and advantages of the present invention will be readily apparent and fully understood from the following detailed description, taken in connection with the appended drawings, in which.

DETAILED DESCRIPTION

As described above, aspects of the present invention relate to systems, methods, and computer-readable media for processing electronic ink data. The following description is divided into sub-sections to assist the reader. The sub-sections include: Terms; General Description of Various Aspects of the Invention; Example Hardware; Example Systems, Methods, and Computer-Readable Media According to the Invention; and Conclusion.

I. Terms

The following terms are used in this specification and, unless otherwise specified or clear from the context, the terms have the meanings provided below:

"Pen"—Any type of user input device useful in entering ink into and/or otherwise manipulating or controlling an electronic document. The terms "pen" and "stylus" are used interchangeably in this specification.

"Pen-Down Event"—An event that is initiated at the time a pen contacts a digitizer. Typically, a pen-down event will end at the time the pen leaves the digitizer surface (also called a "pen-up event" in this specification).

"Hover"—Positioning or locating a pen proximate or adjacent to a digitizer surface but not in contact with the surface. No specific time period or cessation of motion at a particular location or position is necessary to constitute a "hover" action. For example, a "hover" may occur during the time period that a user continuously moves a pen toward and into contact with a digitizer surface.

"Render" or "Rendered" or "Rendering"—The process of determining how information (including text, graphics, and/or electronic ink) is to be displayed, whether on a screen, printed, or output in some other manner.

"Computer-Readable Medium" means any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. General Description of Various Aspects of the Invention

Aspects of the present invention relate to systems and methods for processing electronic ink in pen-based computing systems and/or other computing systems that process, display, and/or otherwise handle electronic ink data. One aspect of this invention relates to systems and methods that: (a) receive electronic ink input (e.g., through an input device, such as a digitizer); (b) convert the electronic ink input to one or more machine-generated objects (using a computer processor having handwriting recognition capabilities); and (c) render the one or more machine-generated objects such that a size of the machine-generated object or objects substantially corresponds to an original size of the electronic ink input (e.g., using a computer processor that drives a monitor, display, printer, or other rendering device). In at least some examples of the invention, the electronic ink input will constitute electronic ink textual input, and the machine-generated objects will correspond to words, lines, and/or other groupings of machine-generated text.

Additional aspects of the invention relate to determining the original size of electronic ink input and rendering the machine-generated object(s) in a size corresponding to the determined original size. This may be accomplished in any suitable manner without departing from the invention. For example, the original size of the electronic ink input may be determined based on an average size of at least some portion of the electronic ink input (e.g., its average height), and the corresponding machine-generated object(s) then may be rendered at appropriate size(s) based on the average size of the portion(s) of the electronic ink text. As a more specific example, the original size of electronic ink text may be determined on a word-by-word basis, and the corresponding machine-generated text then may be rendered at a font size corresponding to the determined ink text size, on a word-by-word basis. As another example, the original size of electronic ink text may be determined based on an average size of a line of the electronic ink text, on a line-by-line basis, and the corresponding machine-generated text then may be rendered, on a line-by-line basis, at a font size based on the average size of the electronic ink text line.

Aspects of the invention also relate to user interaction with the machine-generated objects after they have been rendered on systems and methods according to examples of the invention. In some examples of the invention, a user may select at least one object from the rendered machine-generated object or objects (e.g., one or more words), and the systems and methods then will display (at least temporarily) the original electronic ink input corresponding to the selected machine-generated object or objects. In some examples, the original ink will actually replace the machine-generated object(s) while the selection procedure continues. This action may help users quickly and easily determine whether the handwriting recognizer has made recognition errors. Such systems and methods, according to at least some examples of the invention, further may display machine-generated alternative objects corresponding to the selected original ink input (e.g., one or more alternative words in a listing, akin to a conventional spell-check listing or handwriting recognizer listing of possible alternatives). A user then may select one of the displayed machine-generated alternative objects, and the systems and methods according to this example of the invention will replace the originally rendered machine-generated object with the newly selected machine-generated text alternative object (e.g., again, akin to using a spell-checking or handwriting recognition engine to substitute an alternative word from a machine-generated list of possible alternatives for an original (incorrect) machine-generated word).

In at least some examples of the invention, the recognition and rendering will take place such that the rendered machine-generated objects (e.g., words, lines, paragraphs, etc.) are arranged so as to at least substantially correspond to an original arrangement of the electronic ink input. In this manner, information from the arrangement or orientation of the ink data is not lost in the recognition process.

Additional aspects of the invention relate to computer-readable media including computer-executable instructions stored thereon for performing various methods and/or operating various systems, including systems and methods like those described above.

III. Example Hardware

Figure 1:
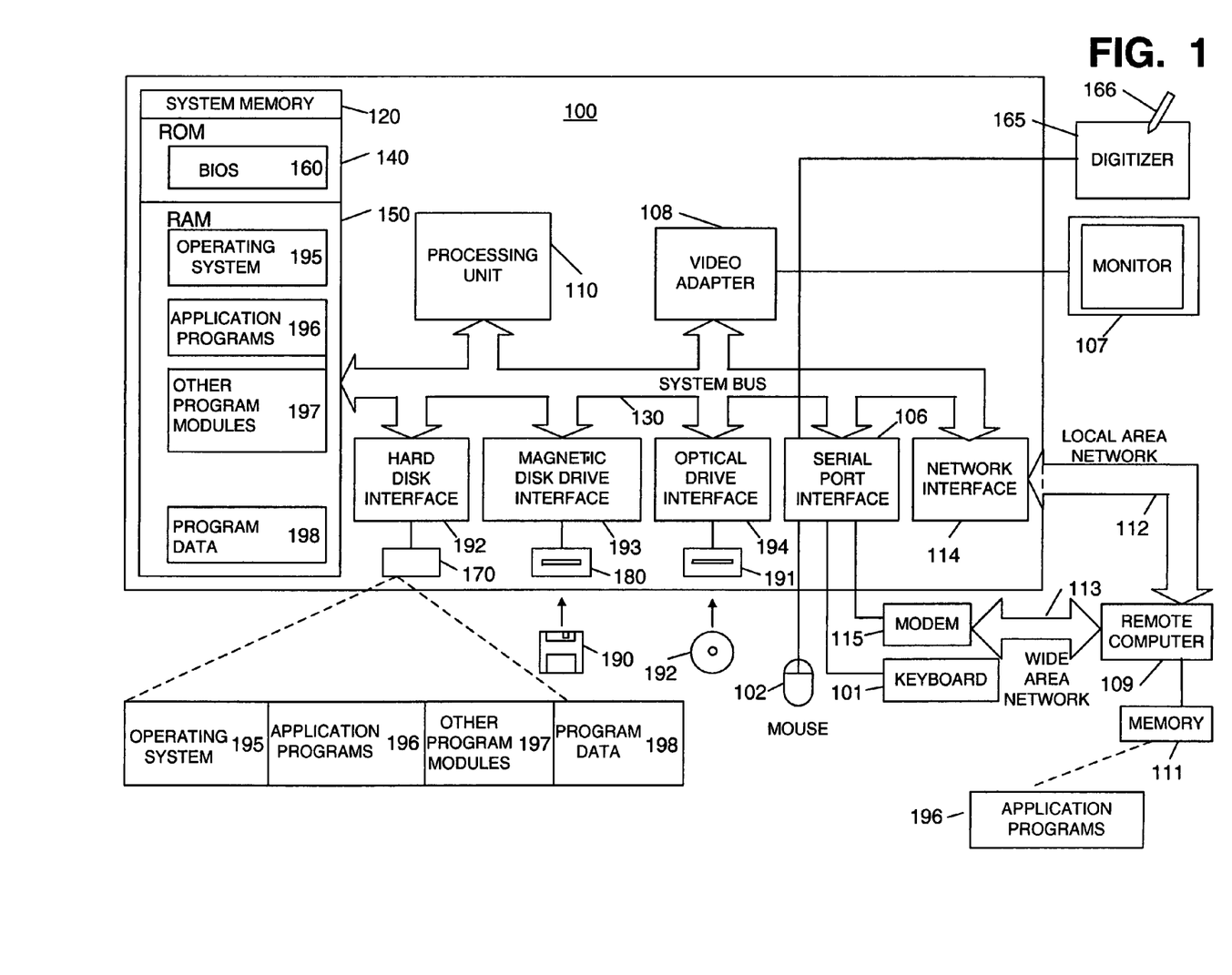
FIG. 1 illustrates a schematic diagram of a general-purpose digital computing environment in which certain aspects of the present invention may be implemented.

FIG. 1 illustrates a schematic diagram of a general-purpose digital computing environment that can be used to implement various aspects of the present invention.

In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
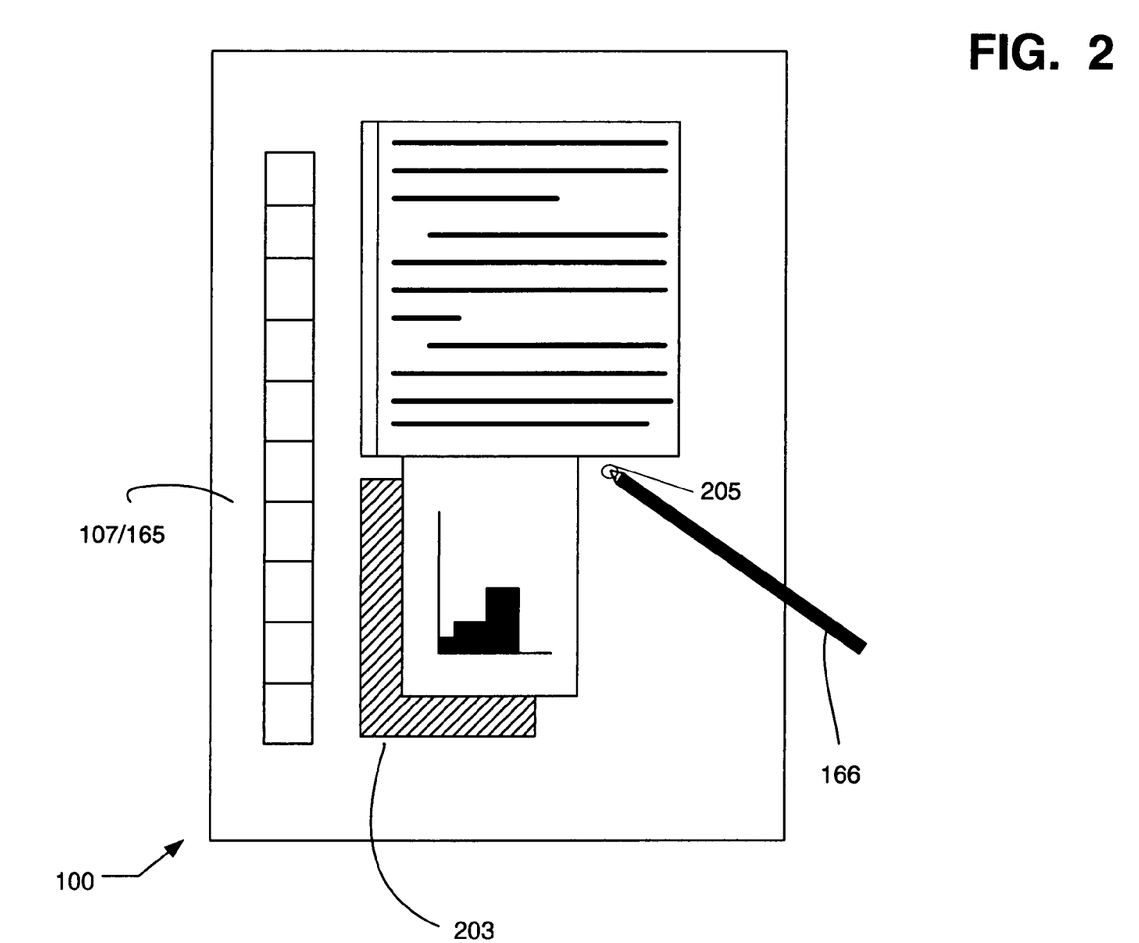
FIG. 2 illustrates a pen-based personal computing (PC) environment in which certain aspects of the present invention may be implemented.

FIG. 2 illustrates a pen-based personal computer (PC) 100 that can be used in accordance with various aspects of the present invention. Any or all of the features, subsystems, and functions in the system of FIG. 1 can be included in the computer 100 of FIG. 2. The pen-based personal computer system 100 includes a large display surface 107/165, e.g., a digitizing flat panel display, such as a liquid crystal display (LCD) screen, on which a plurality of windows 203 are displayed. Using stylus 166, a user can select, highlight, and write on the digitizing display area and thereby enter electronic ink data into the system. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, may also be used. The pen-based computing system 100 interprets gestures made using stylus 166 in order to manipulate data, enter text as electronic ink, and execute conventional computer application tasks, such as creating, editing, and modifying spreadsheets, word processing programs, and the like.

The stylus 166 may be equipped with buttons or other features to augment its capabilities. In one example, a stylus 166 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used as an input device, e.g., for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of component object model (COM) services that an operating system and/or an application program can use to capture, manipulate, and store ink and/or pen actions or events. The ink platform also may include a mark-up language including a language like the extensible markup language (XML). Further, the system may use distributed component object model (DCOM) as another implementation. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention may be used in conjunction with other types of pen-based computing systems and/or other devices that accept data as electronic ink and/or that accept process, or display electronic pen or stylus input, such as: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus or which can process electronic ink collected by another device (e.g., a conventional desktop computer that can process electronic ink collected by a tablet PC).

The invention now will be described in conjunction with the remaining figures, which illustrate various examples of the invention and information to help explain the invention. The specific figures and information contained in this detailed description should not be construed as limiting the invention.

Figure 3A:
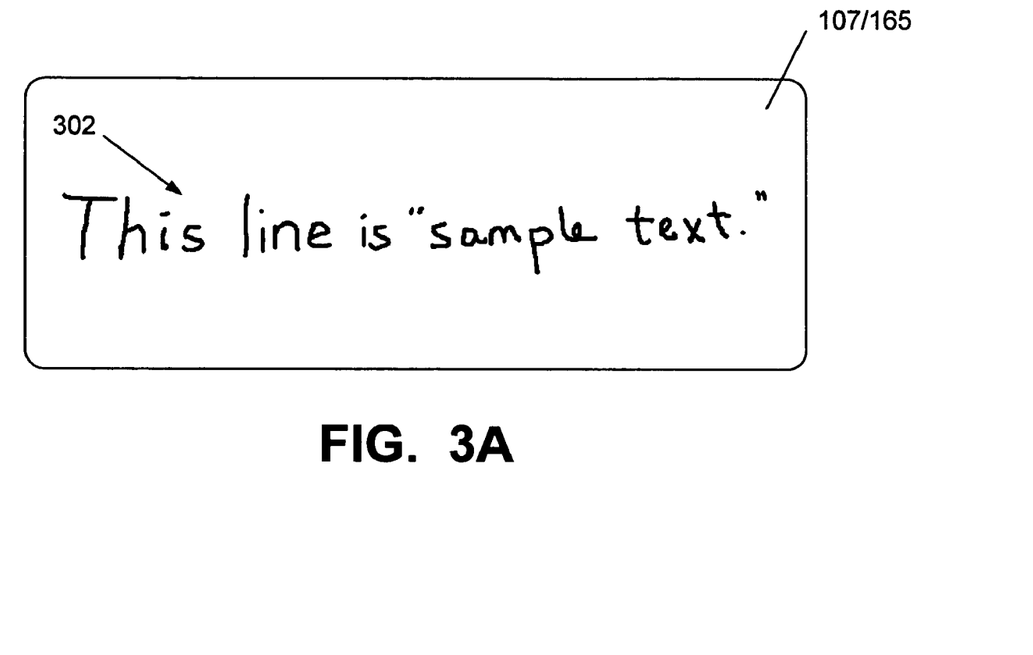
FIGS. 3A and 3B illustrate an example of initial processing of input ink according to some examples of this invention.
Figure 3B:
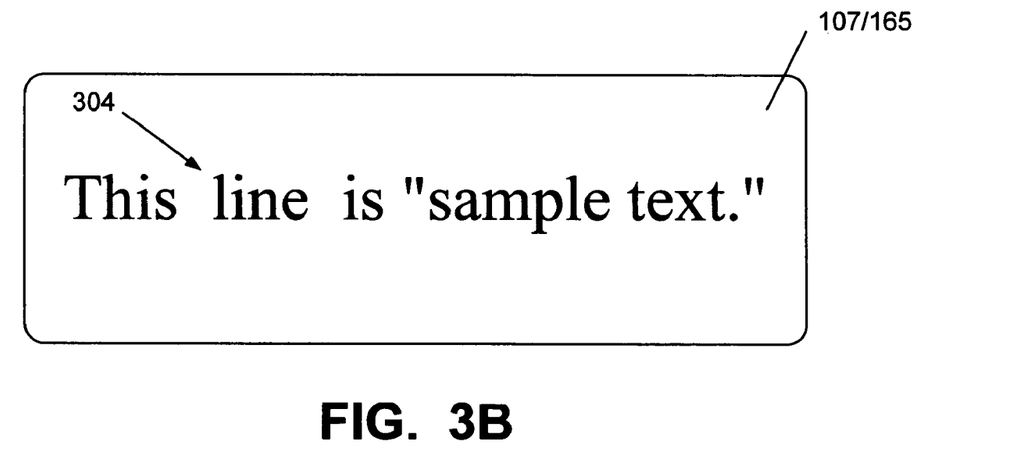

IV. Example Systems, Methods, and Computer-readable Media According to the Invention As described above, aspects of the present invention relate generally to systems and methods for processing electronic ink in pen-based computing systems and other computing systems. FIGS. 3A and 3B generally illustrate input and initial processing of electronic ink data in systems and methods according to at least some examples of this invention. As is conventional and known in the art, users of pen-based computing systems, such as the tablet PC, can input data in electronic ink format. In the example of FIG. 3A, a user has written the sentence, "This line is 'sample text'" (reference number 302), in electronic ink on the display screen/digitizer 107/165 of a pen-based computing system. The system will collect the data as the user inputs it, and the system then displays the sentence in the user's handwriting in electronic ink on the display screen 107/165. The ink data can be collected in any suitable manner and stored in any suitable format without departing from the invention, including the use of conventional formats as are known in the art, such as ink serialized format ("ISF").

At any appropriate time while or after the electronic ink data is collected, systems and methods according to at least some examples of the invention will send this data to a handwriting recognition engine, which will attempt to recognize the text corresponding to the handwritten data. The systems and methods according to the invention can automatically send the data to the handwriting recognition engine, optionally, as it is collected, after the user has stopped inputting ink for a predetermined time period, or at any other suitable or desired time or interval. As another alternative, the user could take appropriate action that sends the data to the handwriting recognition engine, for example, by clicking on an icon and/or a menu item, optionally after selecting some or all of the handwritten input.

Once the handwriting recognizer has processed the handwritten input data, it returns the recognized text to the application program (and/or otherwise makes it available to the application program). As illustrated in FIG. 3B, systems and methods according to this example of the invention automatically replace the original handwritten ink input 302 with machine-generated text corresponding to that input (reference number 304), as generated by the handwriting recognition engine. This machine-generated text 304 then may be used in any conventional manner by computer systems, such as in word processing programs, in spreadsheets, email applications, web browsers, etc.

Notably, in this illustrated example, the machine-generated text 304 is scaled to a font size that substantially corresponds to the size of the original handwritten text 302. Additionally, the machine-generated text 304 maintains essentially the same orientation and arrangement as the original handwritten text input 302, e.g., the inter-word spacing and word positioning in the machine-generated text 304 is the same or substantially the same as that in the original handwritten text 302.

Figure 4A:
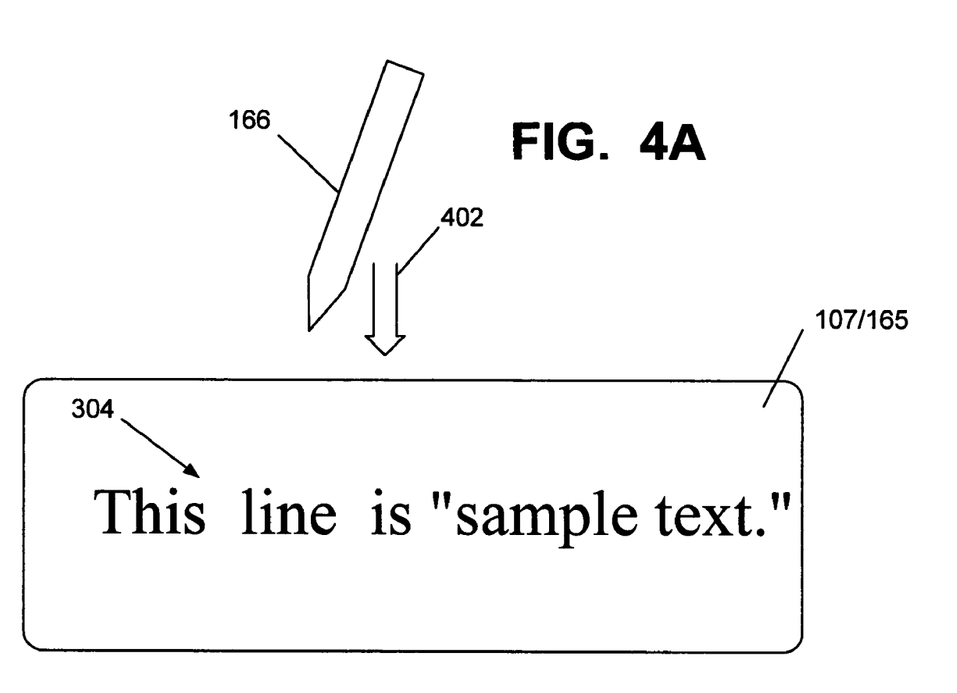
FIGS. 4A and 4B illustrate an example of selection features available in some examples of this invention.
Figure 4B:
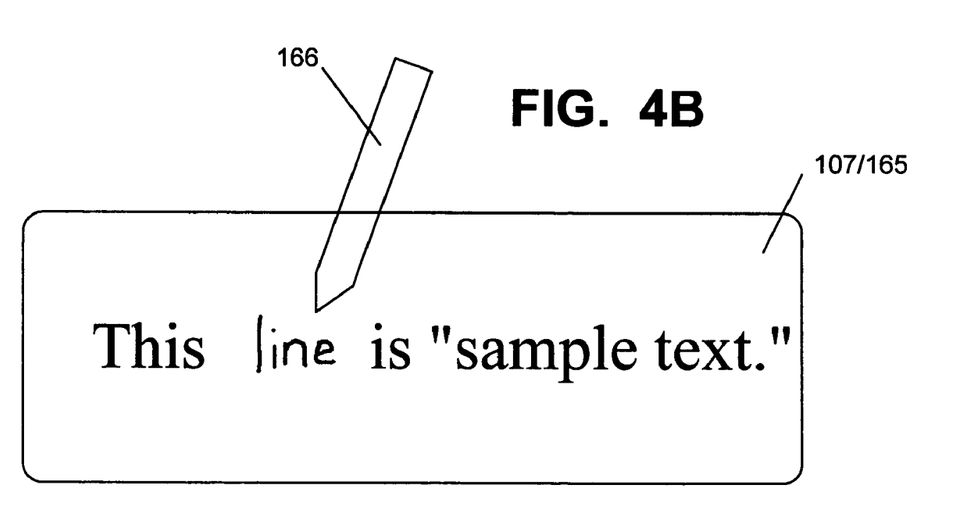

FIGS. 4A and 4B illustrate additional features available in at least some examples of this invention. As illustrated in FIG. 4A, after the input ink data has been received and recognized, as described above, systems and methods according to this example of the invention will display the machine-generated text 304 (see also FIG. 3B and its corresponding description above). In the illustrated example, a user brings the electronic pen or stylus 166 toward the display screen 107/165, as indicated by arrow 402. This action ultimately results in the selection of the word "line."

Selection can take place in any suitable or desired manner or as the result of any suitable or desired action without departing from the invention. For example, in some examples of systems and methods according to the invention, touching the stylus 166 on the display screen 107/165 (a "pen-down event") will result in selection of the specific word at the location of the contact (e.g., if the stylus 166 contacts the digitizer screen 107/165 within the "bounding box" occupied by a word, this action will result in selection of that word). In other examples of systems and methods according to the invention, a stylus 166 may be detectable by a digitizer while hovering adjacent to the digitizer's surface 107/165. This may be accomplished in any suitable manner without departing from the invention, including in conventional manners known to those skilled in the art. For example, some styli are "active," which in this specification means that they transmit, reflect, alter, or otherwise modify energy, data, or other information transmitted by and/or detectable by a digitizer when the stylus 166 is located near the digitizer surface 107/165. A stylus 166 may include circuitry or other structure that receives energy emitted by the digitizer and/or alter magnetic or electronic fields transmitted by and/or sensed by the digitizer, such that the presence of the stylus 166 near the digitizer surface 107/165 can be sensed by the digitizer due to changes in detected magnetic or electric fields. As another example, a stylus 166 may transmit or reflect data, electrical or magnetic fields, or other energy or information that is detectable by the digitizer, at least when located near the digitizer surface 107/165. Any suitable or desired way of sensing or detecting the presence of a stylus 166 when it is located near a digitizer surface 107/165 may be used without departing from this invention. Although a stylus and digitizer combination may be designed to allow detection of a stylus 166 at virtually any reasonable position with respect to the digitizer surface 107/165, in at least some conventional pen-based computing systems with active pens, the stylus 166 is initially detectable when it is about one-half to two inches from the digitizer surface 107/165, and in some examples, when it is approximately a half inch to an inch from the digitizer surface 107/165. In such systems, if desired, selection of a word may result when the stylus 166 hovers above the surface of the display screen 107/165, and the word immediately beneath or adjacent the tip of the stylus 166 during the hover action will be the word selected (e.g., if the hover action occurs over a bounding box of a word, that word will be selected).

As illustrated in FIG. 4B, when selection occurs (e.g., when the stylus 166 contacts or hovers over the digitizer surface 107/165 at the location of a word's bounding box), the machine-generated text corresponding to the selected word (the word "line" in this example) is replaced with the original electronic ink input. Because the font size of the machine-generated text was scaled to correspond to the original ink input, the original ink corresponding to the selected machine-generated word (the word "line" in this example) comfortably fits in the available space within the line of machine-generated text. Accordingly, by making a selection, a user can easily determine if the handwriting recognizer has substituted the correct machine-generated text for the original handwritten ink text.

When the selection ends without further action by the user (e.g., by a "pen-up event," discontinuation of the hover action, movement of the pen, activation of another function, or in some other appropriate manner), the substituted handwritten ink text will again be replaced by the machine-generated text, and the line of text will return to the form illustrated in FIGS. 3B and 4A in this example. If desired, in some examples of the invention, the return to machine-generated text may take place after a predetermined delay time period.

Figure 5:
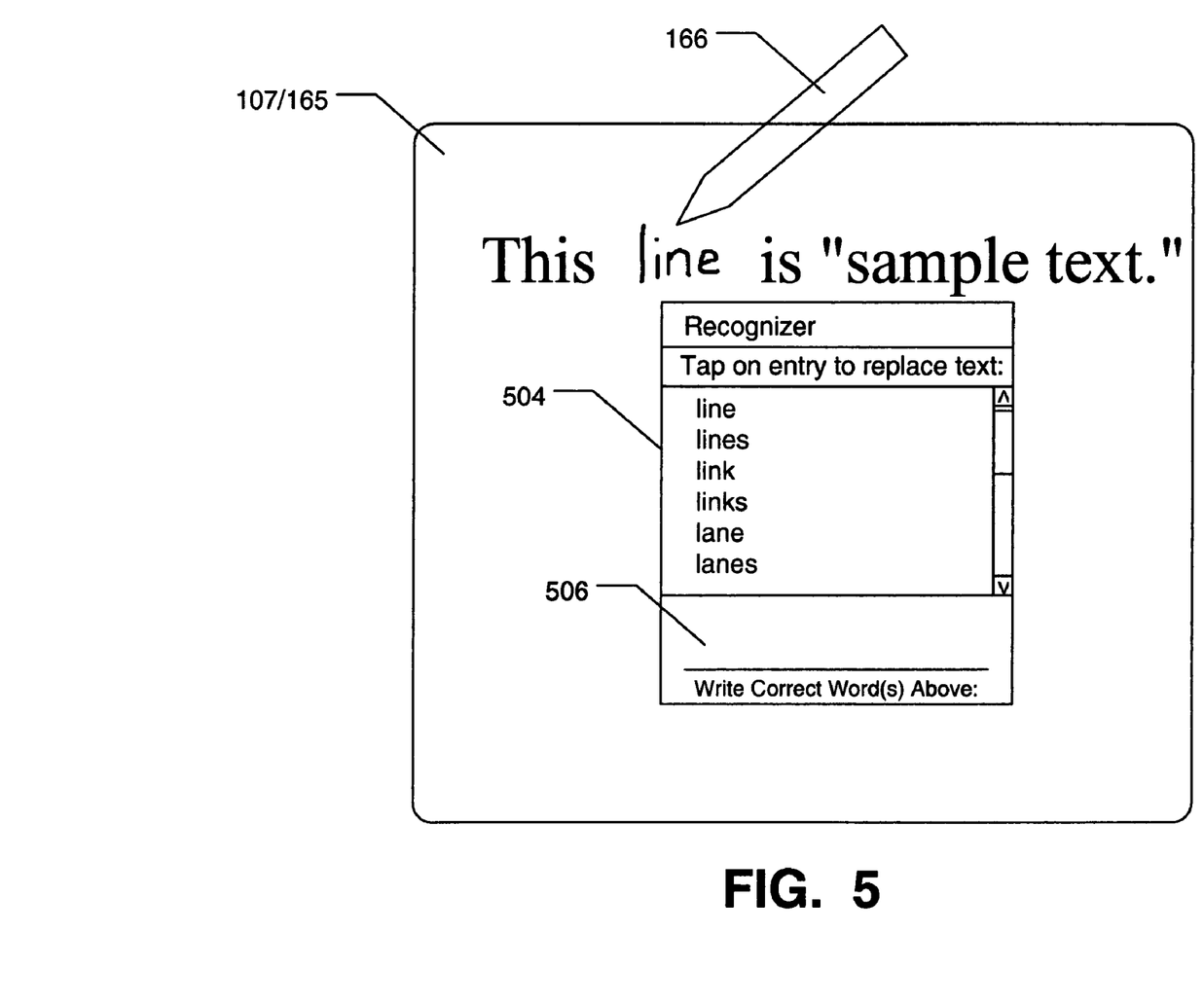
FIG. 5 illustrates an example of machine-generated text replacement features available in some examples of this invention.

In some instances, handwriting recognition technology will not correctly identify the original ink words, and it will produce machine-generated text that does not correctly correspond to the handwritten ink text. Users may desire to correct these errors. FIG. 5 illustrates an example of a selection action in which the recognizer gives potential alternatives for the machine-generated text, as well as an opportunity to make corrections in the machine-generated text. During a tap, hover, or other selection action, e.g., as described above in conjunction with FIGS. 4A and 4B, the machine-generated text is replaced by the original handwritten ink text. For example, as also illustrated in the digitizer/display screen 107/165 of FIG. 5, the stylus 166 contacts the machine-generated word "line," which causes the original electronic ink text for the word "line" to appear. In an alternative implementation, the stylus 166 may hover over the machine-generated word "line" to cause the original ink text to appear. In at least some examples of the invention, the action of contacting or hovering over a word may cause a list of potential alternatives 504 for the selected word to appear (akin to a list of potential alternatives when using a conventional spell-checking program, a conventional handwriting recognition program, or the like). If the user determines that the original machine-generated text supplied by the application program does not correctly correspond to the original ink text, he or she can use this procedure to correct and replace the machine-generated text with the correct word or words. For example, when the list 504 appears, a user can tap or touch on one of the available alternatives to select the alternative, which will cause machine-generated text corresponding to the selected alternative to replace the originally present machine-generated text, optionally after touching a key or icon authorizing the systems to make the substitution (again, akin to using conventional spell-checking or handwriting recognition programs or the like). The original ink will remain unchanged in this process, and it will continue to be available, for example, in future selection actions or for any other suitable or desired purpose.

If desired, the list of potential alternatives 504 may include an inking area 506 that allows the user to write in one or more ink words (e.g., in the event that the desired word does not appear in the list of potential alternatives 504 or is not seen by the user). Alternatively, rather than providing inking area 506 (or in addition to providing it), the user could erase the original ink word(s), at their original location, and then rewrite the original words (or write new words), without departing from the invention. The handwriting recognition engine then will attempt to recognize the newly written ink words (whether in the inking area 506 or in the original ink location) and replace the original machine-generated text with new machine-generated text generated from the new handwritten ink words.

In at least some examples of systems and methods according to the invention, correction and/or replacement of text, e.g., as described above (optionally after a predetermined number of repeated corrections or replacements), may be used to establish a rule or preference so that the handwriting recognition engine does not continually make the same mistake(s). Automatic customization or personalization of the handwriting recognition engine in this manner may occur, for example, on an individual letter basis (e.g., the recognizer may determine which individual letter was misread and in this manner become familiar with an individual user's writing characteristics or style), or it could occur on a word basis (e.g., whenever the recognizer sees a specific combination of letters or strokes, it could select a specific word). Other customization or personalization options, including automatic customization or personalization as described above, also are possible without departing from the invention.

The handwriting recognition engine may generate the list of potential alternatives 504 in any suitable manner without departing from the invention, including in conventional manners known in the art. Any suitable or desired action may initiate the appearance of the list of potential alternatives 504 without departing from the invention. For example, if the user maintains the stylus 166 at a location in which a word is selected for a predetermined time period, this may cause the list of potential alternatives 504 to appear (e.g., a "press-and-hold" or "hover-and-hold" action). As another example, before or after selection, a menu item could be activated to initiate display of the list of potential alternatives 504. As still another possible alternative, the list of possible alternatives 504 could appear promptly, any time a selection action is initiated. Other possible ways of initiating this process also are possible without departing from the invention.

As another option or alternative, word selection in the manner illustrated in FIGS. 4A, 4B, and 5 may activate systems and methods according to at least some examples of the invention to accept input via other modes of operation. For example, when one or more words are selected (e.g., like the word "line" is selected in FIGS. 4B and 5), this could activate systems and methods according to some examples of the invention, at least optionally, to accept changes to the recognized text via speech, a hard or soft keyboard, or some other modality. As a more specific example, when the word "line" is selected as shown in FIGS. 4B and 5, if a user then speaks one or more words into a voice input system available on the computer, systems and methods according to these examples of the invention could recognize the spoken word(s) (e.g., using conventional speech recognition software) and substitute the recognized spoken word(s) for the selected word or words on the display (i.e., the word "line" in this example). As still another possible option, systems and methods according to at least some examples of the invention may utilize the results from both the handwriting recognition engine and the voice recognition engine and substitute the best alternative for the originally selected text based on the best matches of the results from these two recognition engines. Any appropriate algorithm for comparing and utilizing the results from the various recognition engines may be used to determine the best alternative to be substituted without departing from the invention. Also, these other modes of operation may be activated in any suitable manner without departing from the invention, for example, automatically upon selection of the text, through user input (e.g., by selecting a menu item, by tapping an icon, by beginning to speak, etc.), or in any other desired or appropriate manner.

Figure 6A:
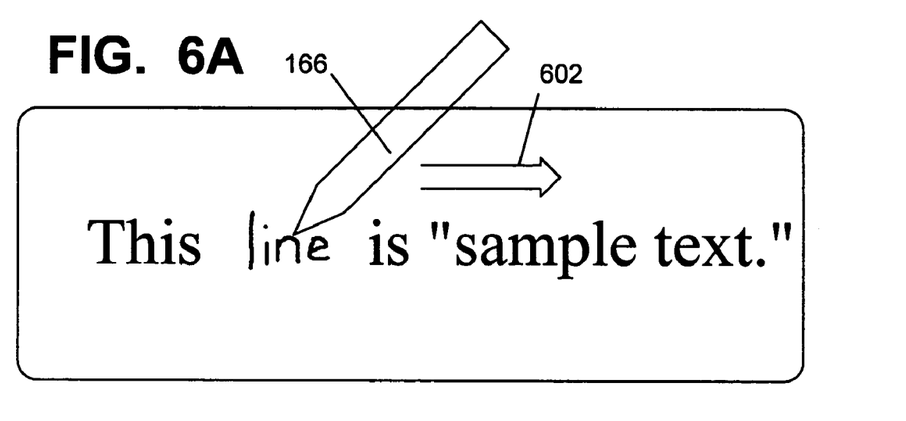
FIGS. 6A through 6C illustrate an example of additional selection features available in some examples of this invention.
Figure 6B:
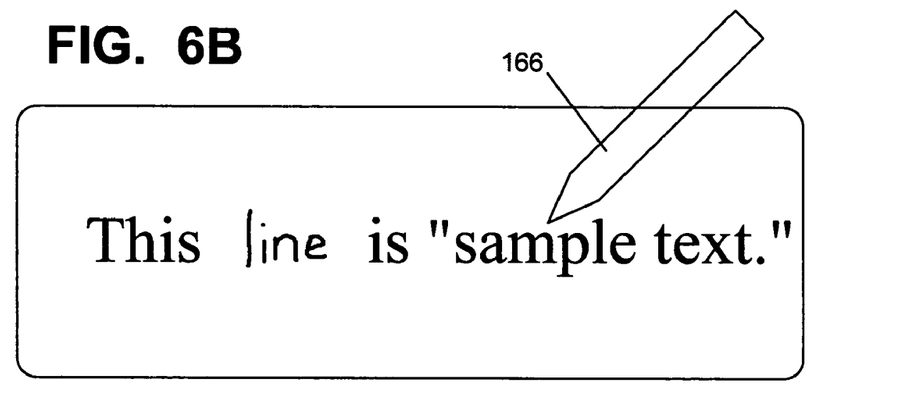
Figure 6C:
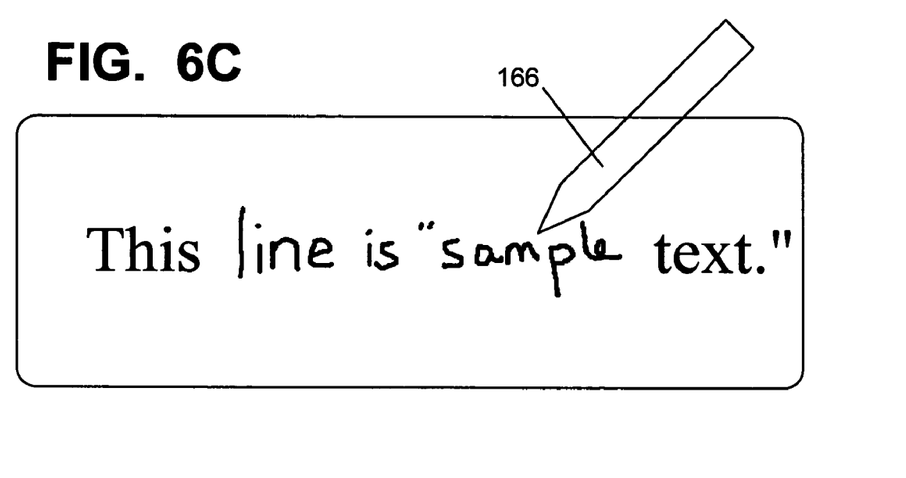

Word selection, however, is not limited to selection of a single word, as illustrated in FIGS. 4A, 4B, and 5. Rather, in at least some examples of the invention, any number of words may be selected, as illustrated in the example of FIGS. 6A through 6C. As shown in FIG. 6A, in this example, selection begins in the same manner as described in FIGS. 4A and 4B with selection of the word "line." While in the selection mode (e.g., while the stylus 166 is contacting or hovering over the first word of the selection and the original ink is being displayed), the stylus 166 is moved (indicated by arrow 602) to select additional words. In the example illustrated in FIGS. 6A and 6B, the additional words "is" and "sample" are selected. Once the selection is complete, as illustrated in FIG. 6C, the additional selected machine-generated words are replaced by their corresponding original ink words while the selection activity persists (e.g., while the pen-down event or the hover event continues). Lifting the stylus 166 or otherwise terminating the selection event in any manner will change the ink text back to the machine-generated text in this example. Additionally, in at least some examples of systems and methods of the invention, changes to one or more of the selected machine-generated words may be made, for example, in the general manner described above in conjunction with FIG. 5, e.g., using handwriting recognition results, speech recognition results, a combination thereof, and/or in any other suitable or desired manner.

Figure 7A:
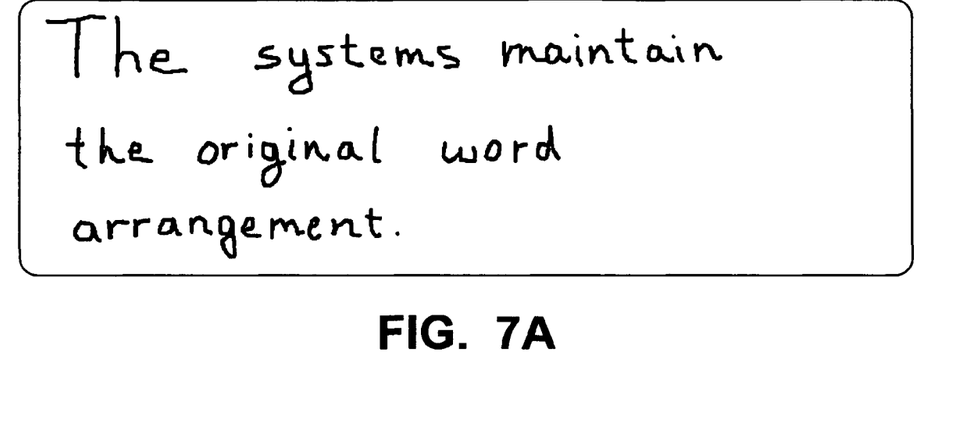
FIGS. 7A through 7C illustrate examples of various display features or options available in some examples of this invention.
Figure 7B:
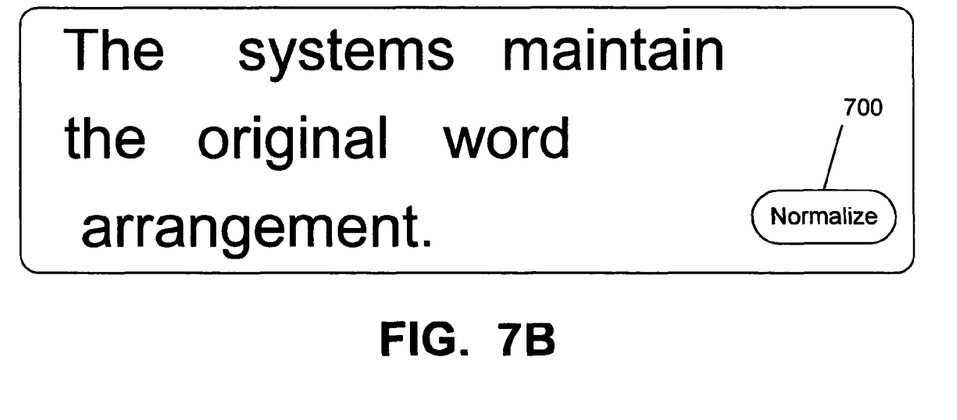

FIGS. 7A and 7B illustrate additional features present or available in at least some examples of the invention. As illustrated, in this example, the handwritten text is recognized and converted to machine-generated text, and the font of the machine-generated text is scaled to generally match the size of the original handwritten ink text. In some examples of the invention, the machine-generated text may function like standard word processing text in which the words continually fill a line of text until the line is full and the next succeeding word will not fit on the line. Then, the next succeeding word will start the next line of text. In that situation, in the example provided in FIGS. 7A and 7B, the recognizer would place the word "the" on the same line with the word "maintain," because there is sufficient room on that line for the word "the."

In other examples of the invention, however, as illustrated in FIGS. 7A and 7B, the original ink word arrangement and spacing is maintained in the machine-generated text. This arrangement is particularly advantageous, for example, in instances when the orientation or arrangement of text also conveys information to the reader, for example, if the text contains lists, rows, columns, charts, mathematics, formulae, etc. If desired, systems and methods according to at least some examples of the invention could be provided with a "normalize" function, which, when activated by the user, will "normalize" the machine-generated text to a more typical word processing format. For example, as illustrated in FIG. 7B, when the "normalize" function is selected (indicated by icon 700), this changes the inter-word spacings to a consistent spacing, wraps the words to fill the lines, provides a consistent baseline for all words in the line, provides a common margin or margins, and generally structures the words in a manner as if generated by and/or suitable for use by a word processing application, as shown in FIG. 7C.

Figure 7C:
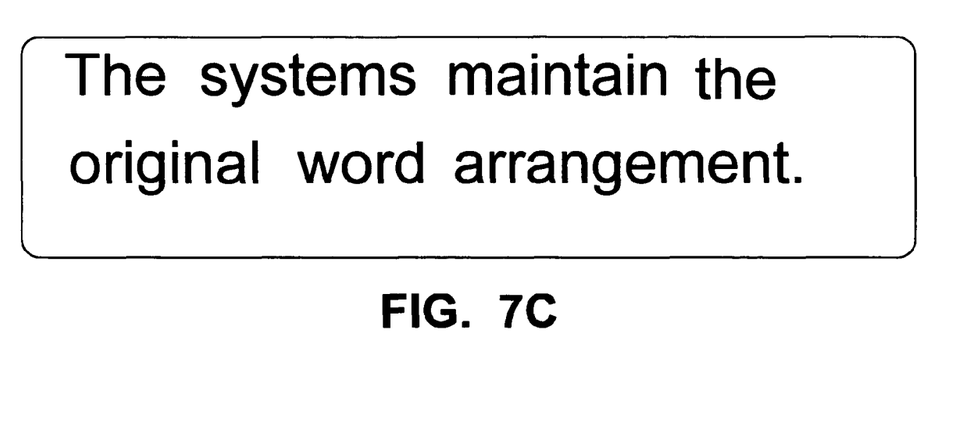

The "normalize" function, as described in conjunction with FIGS. 7A through 7C, may be activated in any suitable or desired manner without departing from the invention. For example, the display screen may include a "normalize" icon 700, as illustrated in FIG. 7B. As another example, the normalize function may be activated from a toolbar available from the application program and/or operating system. As still another example, the normalize function may be activated from a menu that is displayed, for example, as a result of a press-and-hold action using a stylus or some other suitable or desired user input device action. Additionally, the normalize function may be performed on any portion of the machine-generated text (e.g., using a selection action), including all of the text, without departing from the invention.

Of course, both the original ink and the machine-generated text may be in a form and format that allows them to be further used and manipulated in any suitable or desired manner, including in conventional manners known in the art. For example, the ink and machine-generated text may be copied, pasted, moved, shrunk, enlarged, edited, changed in font, and otherwise manipulated without departing from the invention.

Figure 8:
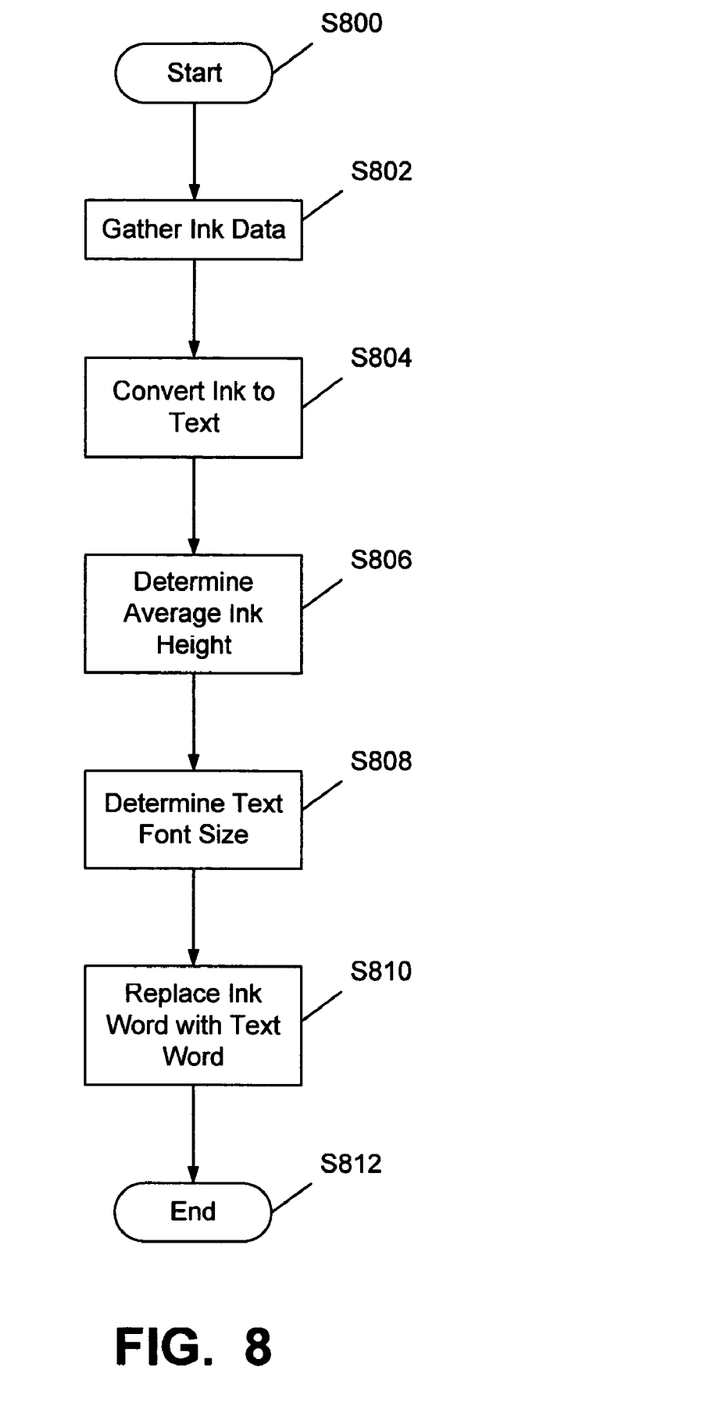
FIG. 8 illustrates an example flow diagram illustrating procedures followed in at least some examples of this invention.

FIG. 8 illustrates an example flow diagram describing processes used in providing and scaling the machine-generated text in at least some examples of this invention. When the procedure starts (S800), the electronic ink data is gathered (S802). As noted above, the ink data can be gathered in any suitable manner and in any suitable format without departing from the invention, including in manners and formats that are conventional and known to those skilled in the art (such as ISF format). Once the original ink data is collected (optionally, at various times while the ink data is being entered), it will be sent to a handwriting recognition engine and converted to machine-generated text (S804).

Then, in order to determine the appropriate font size for rendering the machine-generated text, the average height (or other size characteristic) of the various ink characters may be determined (S806), and a corresponding font size for the machine-generated text also will be determined (S808) based on the determined ink size characteristic. The font size for the machine-generated text may be determined on a character-by-character basis, a word-by-word basis, a line-by-line basis, a paragraph-by-paragraph basis, or on any other suitable or desired basis without departing from the invention. In order to avoid continual and erratic changes in font size over the course of a single word, line, or paragraph, due to inconsistently sized handwritten characters, in at least some examples of the invention, when rendered, the machine-generated text will be consistently sized over a word, line, paragraph, or more (e.g., based on the average height of ink strokes, characters, or words in a line or other portion, or the like).

Once the font size for the machine-generated text is determined (e.g., on a character, word, line, paragraph, or other basis), the handwritten ink is replaced or rendered on the computer display (or other rendering device) as machine-generated text in the manner described above (S810). The procedure then ends (S812), for example, and waits for new and additional input or user commands (e.g., selections, text replacements, etc.).

Of course, FIG. 8 merely constitutes an example of steps that may be taken in accordance with at least some examples of the invention. Those skilled in the art will recognize that the content of the specific steps may be changed, the steps may be performed in a different order, additional steps may be added, and/or existing steps may be omitted or combined without departing from the invention.

Additionally, while the examples of the invention described above are optimized for processing electronic ink data and machine-generated objects in the form of conventional English and other Latin-based words and text, the invention is not limited to use on those types of languages and on that type of electronic ink data and machine-generated objects. Those skilled in the art will recognize that aspects of this invention can be applied to any type of electronic ink data and machine-generated objects, including handwritten text in any language and written or read in any direction without departing from the invention. Additionally, aspects of this invention can be applied to recognition and processing of other types of data and machine-generated objects without departing from the invention, such as data and elements in charts, diagrams, graphs, flowcharts, etc.; musical data or symbols; mathematical or scientific data or symbols; drawings; etc.

Additionally, it is not required in all examples of the invention that the original ink text actually replaces the machine-generated text, e.g., during a selection action. As alternatives, for example, the original ink and machine-generated text could overlap (e.g., with one appearing as background, in a different color, etc.), they could appear adjacent one another (e.g., above or below, alongside, etc.), in a separate pop-up window, etc., without departing from the invention.

Finally, the present invention also relates to computer-readable media including computer-executable instructions stored thereon for performing various methods and/or for use in various systems, including those systems and methods described above. The computer-readable media may constitute computer-executable instructions stored on the various specific examples of computer-readable media described above.

V. Conclusion

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. Various changes and modifications may be made without departing from the spirit and scope of the invention, as defined in the appended claims.

The invention claimed is:

1. A method, comprising:
   receiving electronic ink input;
   converting the electronic ink input to one or more machine-generated objects;
   determining a size of the one or more machine-generated objects by calculating an average height of the corresponding electronic ink input and setting the size of the one or more machine-generated objects to be equivalent in scale for the calculated average height;
   rendering the one or more machine-generated objects using the determined size for the machine-generated object or objects and an original inter-word spacing of the electronic ink input;
   receiving input selecting an object from the rendered machine-generated object or objects; and
   displaying the electronic ink input corresponding to the selected object in place of the selected object.

2. A method according to claim 1, wherein the size of the one or more machine-generated objects is determined by calculating an average height of at least a portion of the electronic ink input.

3. A method according to claim 1, wherein the displayed electronic ink input temporarily replaces the rendered machine-generated object or objects.

4. A method according to claim 1, wherein the one or more rendered machine-generated objects are displayed so as to correspond to an original arrangement of the electronic ink input.

5. A method according to claim 1, wherein the electronic ink input includes electronic ink text input and the one or more machine-generated objects includes machine-generated text, wherein said step of determining the size of the one or more machine-generated objects constitutes determining a font size of the machine-generated text.

6. A method according to claim 5, further comprising:
   calculating the average height of the electronic ink text input on a word-by-word basis, wherein at least two words are separated by said original inter-word spacing.

7. A method according to claim 6, wherein the machine-generated text is rendered, on the word-by-word basis, at a font size based on the calculated average height of the electronic ink text input.

8. A method according to claim 5, further comprising:
   calculating the average height of the corresponding electronic ink text input for a line of the electronic ink text input, on a line-by-line basis, wherein at least one line includes at least two words separated by said original inter-word spacing.

9. A method according to claim 8, wherein the machine-generated text is rendered, on the line-by-line basis, at a font size based on the calculated average height of the electronic ink text input line.

10. A method according to claim 5, further comprising:
    receiving input selecting one or more words from the rendered machine-generated text;
    and
    displaying the electronic ink text input corresponding to the selected machine-generated text.

11. A method according to claim 10, further comprising:
    displaying machine-generated text alternatives corresponding to the selected one or more words.

12. A method according to claim 11, further comprising:
    receiving input selecting a displayed machine-generated text alternative; and replacing the selected rendered machine-generated text with the selected displayed machine-generated text alternative.

13. The method of claim 1, wherein said step of rendering comprises:
rendering the one or more machine-generated objects such that a word positioning of the rendered machine-generated object or objects substantially corresponds to an original word positioning of the electronic ink input.

14. The method of claim 1, wherein said electronic ink input is a table, and said inter-word spacing is a corresponding table column-spacing.

15. The method of claim 1, further comprising:
normalizing said inter-word spacing in response to a user-generated normalization command.

16. A system, comprising:
an input device adapted to receive electronic ink input; and
a processor-adapted to:
(a) convert the electronic ink input to one or more machine-generated objects;
(b) determine a size of the one or more machine-generated objects by calculating an average height of the corresponding electronic ink input and setting the size of the one or more machine-generated objects to be equivalent in scale to the calculated average height;
(c) render the one or more machine-generated objects using the determined size for the machine-generated object or objects and an original inter-word spacing of the electronic ink input, wherein word positions of the rendered machine-generated object or objects on a display correspond to original word positions of the electronic ink input on the display;
(d) receive a request from a user to reformat the machine-generated objects in a manner consistent with a word-processing format; and
(e) in response to the request, adjust the word positions of the rendered machine-generated objects wherein the word positions, the inter-word spacings, word wrap, and margins are consistent with the word-processing format.

17. A system according to claim 16, wherein the electronic ink input includes electronic ink text input and the one or more machine-generated objects includes machine-generated text, wherein said determine the size of the one or more machine-generated objects constitutes determine a font size of the machine-generated text.

18. A system according to claim 17, wherein the input is further adapted to receive a selection of one or more words from the rendered machine-generated text, and wherein the processor is further adapted to display the electronic ink text input corresponding to the selected machine-generated text and to display machine-generated text alternatives corresponding to the selected one or more words.

19. A system according to claim 8, wherein the input is further adapted to receive a selection of a displayed machine-generated text alternative, and the processor is further programmed and adapted to replace the selected rendered machine-generated text with the selected displayed machine-generated text alternative.

20. The system of claim 16, wherein said electronic ink input is a table, and said inter-word spacing is a corresponding table column-spacing.

21. A computer-readable nonvolatile storage medium including computer-executable instructions stored thereon which when executed by a processor perform a method, the method comprising:
receiving electronic ink input;
converting the electronic ink input to one or more machine-generated objects;
obtaining the received electronic ink input and determining a size of the one of more machine-generated objects by calculating an average height of the corresponding electronic ink input and setting the size of the one or more machine-generated objects to be equivalent in scale for the calculated average height;
rendering the one or more machine-generated objects using the determined size for the machine-generated objects or objects and an original inter-word spacing of the electronic ink input;
receiving input selecting an object from the rendered machine-generated object or objects; and
displaying the electronic ink input corresponding to the selected object in place of the selected object.

22. The medium of claim 21, wherein the electronic ink input includes electronic ink text input and the one or more machine-generated objects includes machine-generated text, wherein said step of determining the size of the one or more machine-generated objects constitutes determining a font size of the machine-generated text.

23. The medium of claim 21, wherein said step of rendering comprises:
rendering the one or more machine-generated objects such that a word positioning of the rendered machine-generated object or objects substantially corresponds to word positioning of the electronic ink input.

24. The medium of claim 21, wherein said electronic ink input is a table, and said inter-word spacing is a corresponding table column-spacing.

25. The medium of claim 21, further comprising:
normalizing said inter-word spacing in response to a user-generated normalization command.

* * * * *